INVENTORS
RUSSELL C. PARRISH &
WILLIAM B. CRANE
BY
Parrott & Richards
ATTORNEYS

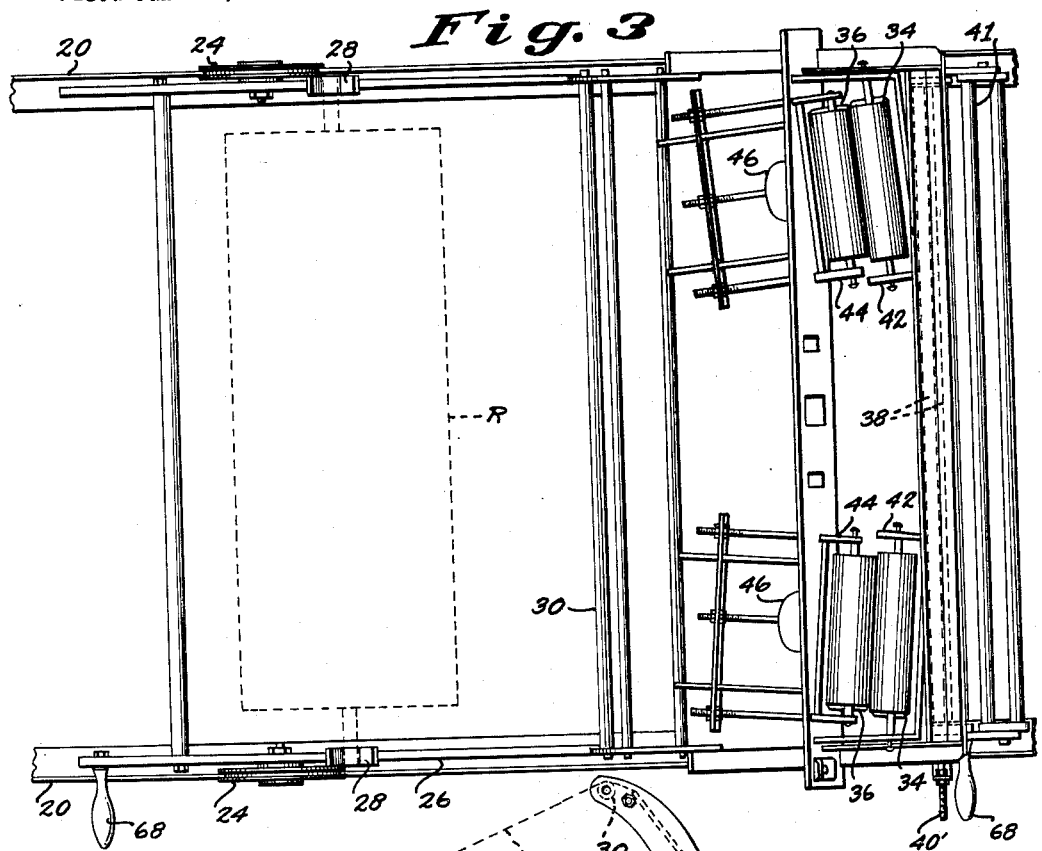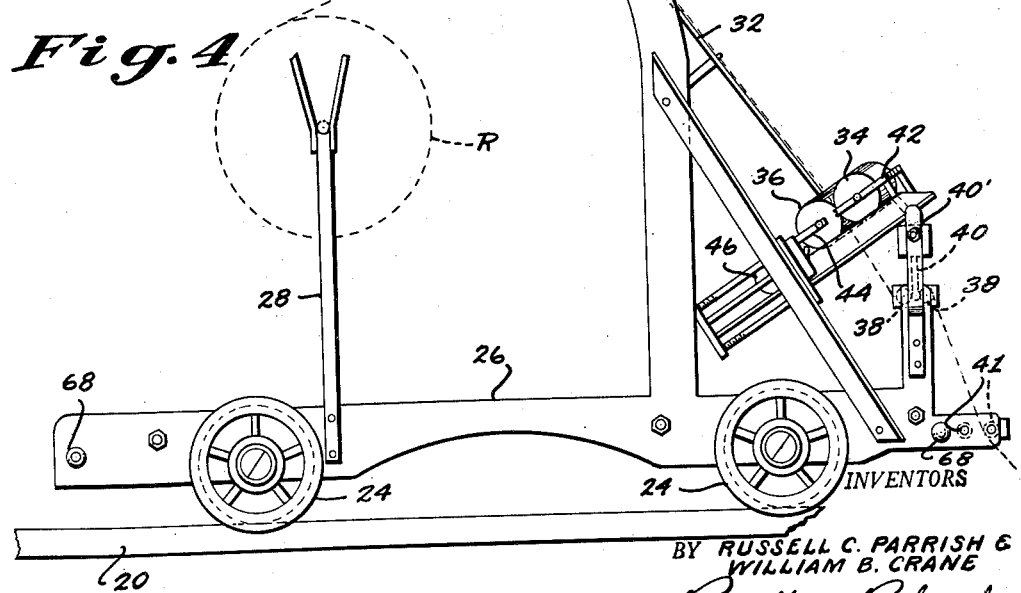

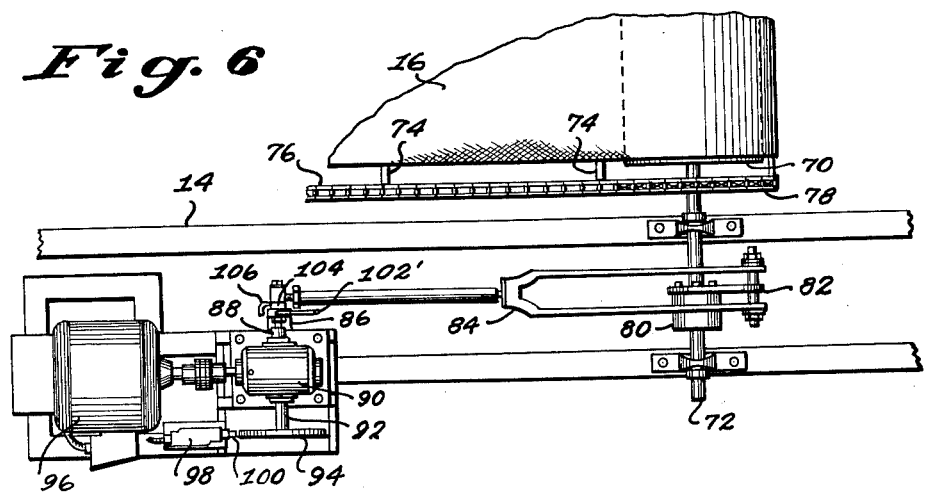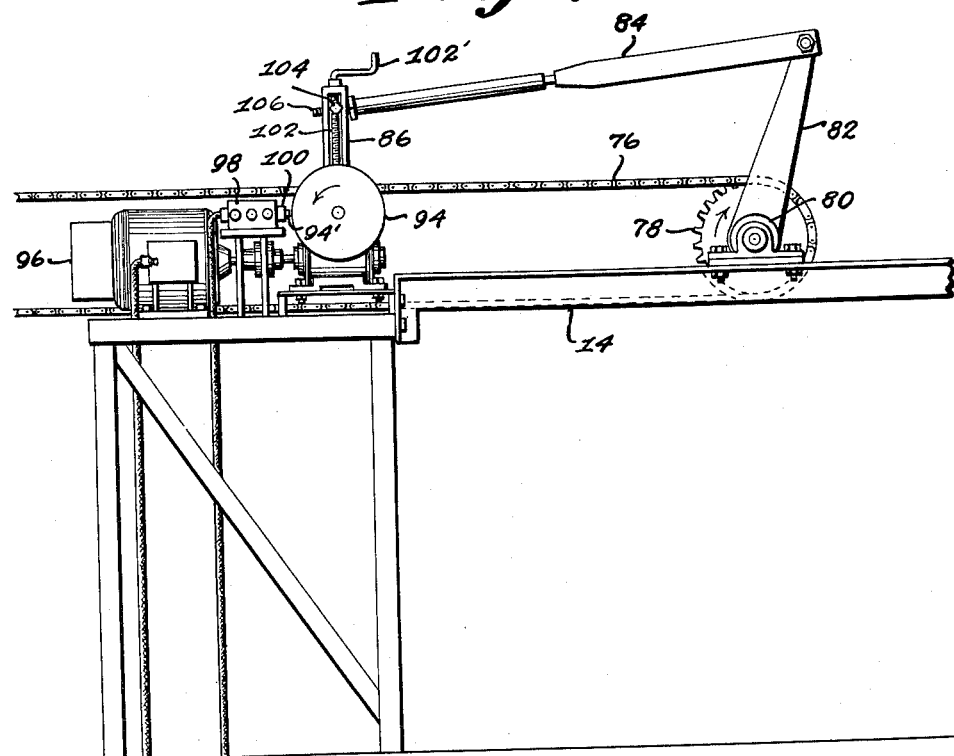

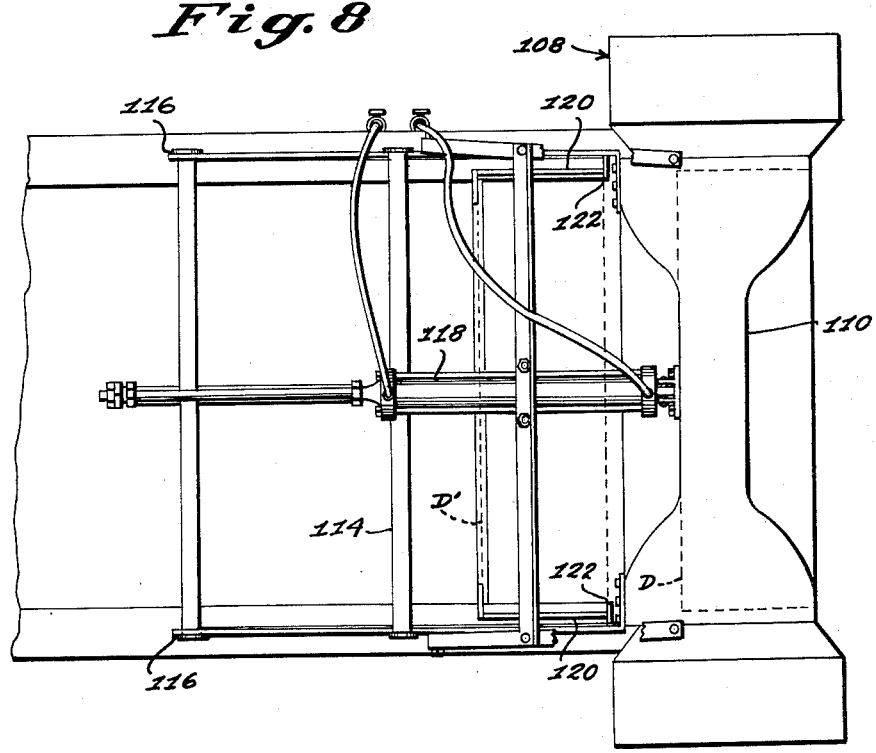
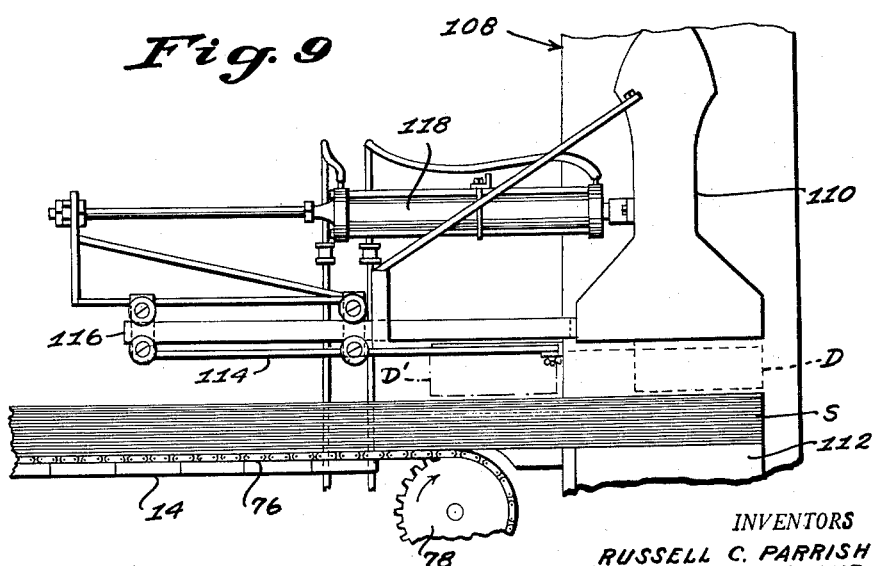

United States Patent Office 3,081,660
Patented Mar. 19, 1963

3,081,660
MEANS FOR CUTTING CLOTH PATTERN BLANKS
Russell C. Parrish, Greenville, Ala., and William B. Crane, Newton, N.C. (both % Riegel Textile Corp., Glove Division, Conover, N.C.)
Filed Jan. 17, 1958, Ser. No. 709,696
6 Claims. (Cl. 83—563)

This invention relates to the cutting of cloth pattern blanks such as are used, for example, in glove manufacture, and more particularly to an improved system for handling a cloth web supply to maximum advantage so that a desired pattern blank may be cut therefrom with minimum waste.

Briefly described, this improved cloth handling system of the present invention provides for tentering a cloth supply web to a straight disposition and a substantially uniform, predetermined, width while steaming before tentering and tightly roll winding the web immediately after tentering to provide for setting the tentered form thereof, spreading a predetermined length of the tentered web from the roll thus formed while maintaining one web edge aligned at a predetermined longitudinal reference line, advancing the spread length of the web in a predetermined stepwise extent, and cutting the desired pattern blanks from the web at each stepwise advance in relation to the longitudinal reference line at which said web was spread and the extent of the stepwise advance.

As a result, the web is handled so that widthwise waste is minimized by the manner in which it is spread and the stepwise advance is controlled to minimize lengthwise waste in cutting the pattern blanks therefrom.

A representative embodiment of the cloth handling system of the present invention is described in further detail below in connection with the accompanying drawings, in which:

FIG. 3 is a fragmentary plan view of the spreading means shown in FIG. 2;

FIG. 4 is a side elevation corresponding generally to FIG. 3;

FIG. 6 is a fragmentary plan view of the means provided to advance the spread cloth for cutting;

FIG. 7 is a side elevation corresponding generally to FIG. 6;

FIG. 8 is a fragmentary plan view illustrating the arrangement of the cutting press in accordance with the present invention; and FIG. 9 is a side elevation corresponding generally to FIG. 8.

Figure 1:
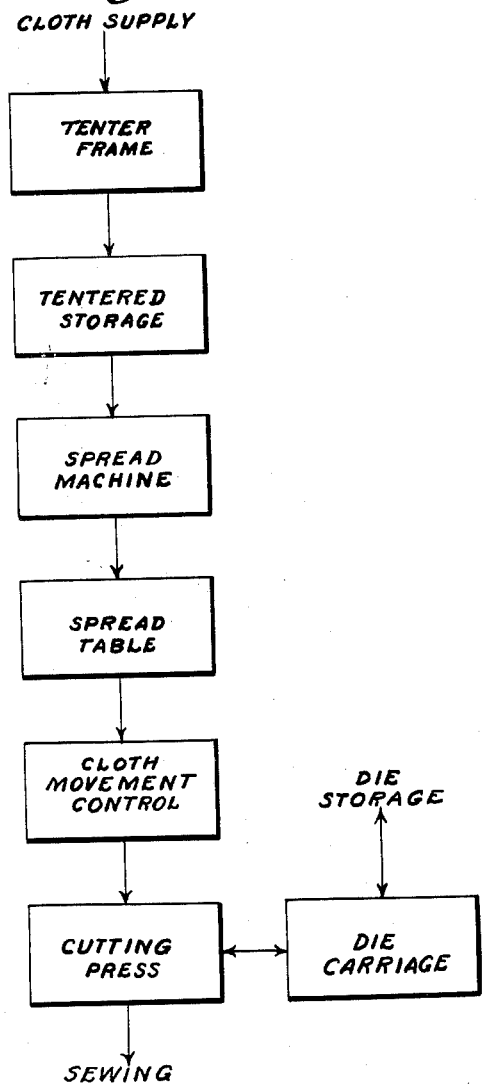
FIG. 1 is a flow diagram indicating the manner in which cloth is handled in employing the method and means of the present invention for cutting cloth pattern blanks.

Referring now in detail to the drawings, FIG. 1 indicates diagrammatically the sequential arrangement and operating relation of the method steps and the means employed in the cloth handling system of the present invention for cutting pattern blanks. As diagrammed in FIG. 1, the cloth supply to be handled is first run through a tenter frame, which may be of conventional form and suitably about ninety feet in length. The tentering operation is carried out to straighten the cloth and obtain a substantially uniform cloth width, so as to avoid the necessity of making an undue width allowance in order to insure a minimum width in the cloth supply and thereby incurring substantial widthwise waste in cutting pattern blanks therefrom.

This widthwise waste factor is particularly important with a number of types of cloth that are characteristically difficult to produce at a uniform width, such as Canton flannel which is used extensively in glove manufacture. By tentering such cloth in accordance with the present invention, the width variations normally occurring in the woven web become unimportant as it is only necessary to weave the cloth for a predetermined width to which the web can be tentered for cutting of the desired pattern blanks therefrom without any substantial marginal width allowance.

In order to provide for setting the tentered width of the cloth supply web so that this width is maintained during subsequent processing according to the present invention, the web is steamed lightly immediately before tentering and then wound into a tight roll. This tentered roll can be used directly to supply the cloth thereon for subsequent arrangement in preparation for the cutting operation if desired or required, but it handles considerably better if it is allowed to set in storage for at least two days, and this is preferably done according to the present invention as indicated in FIG. 1.

Figure 2:
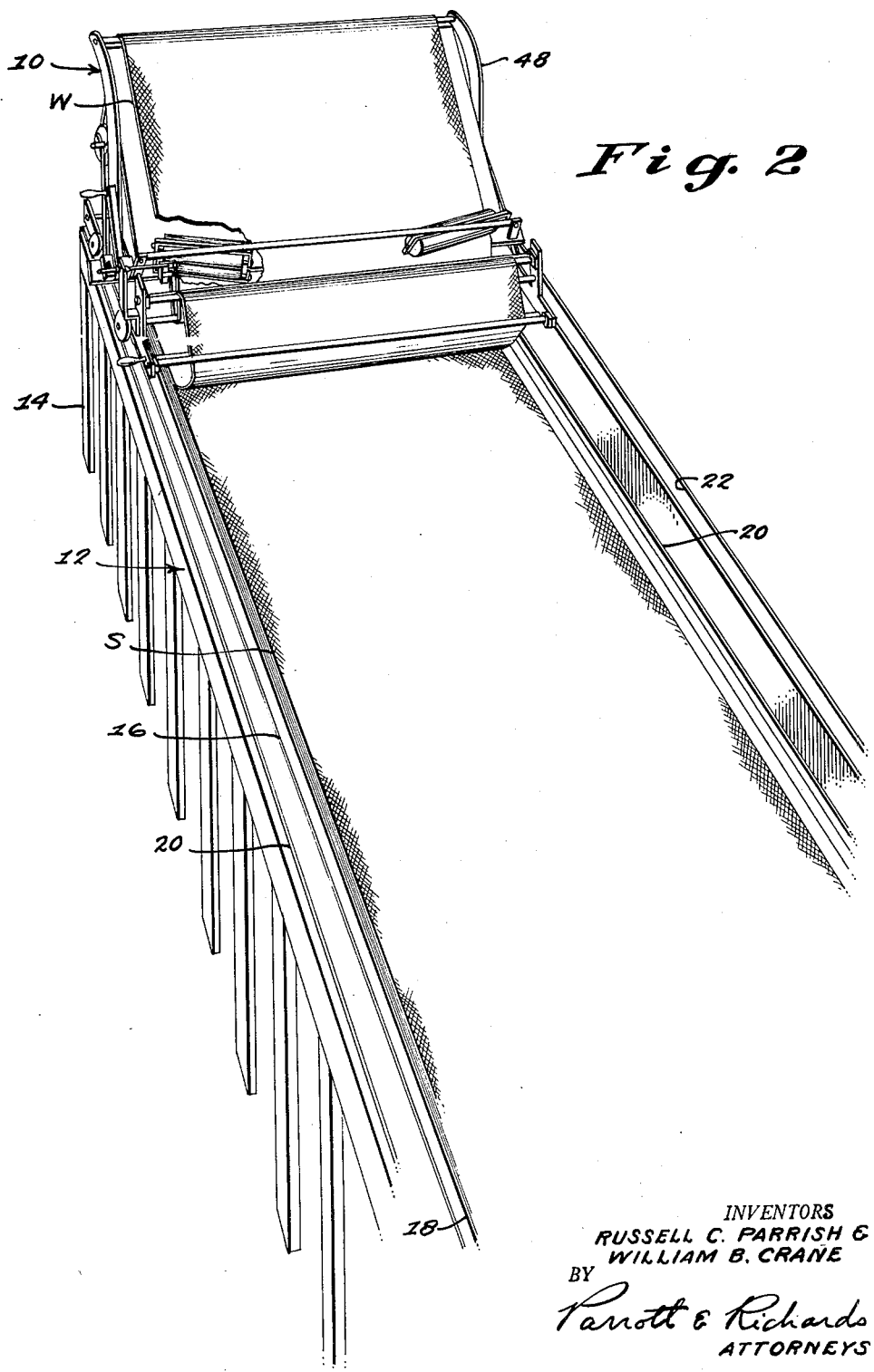
FIG. 2 is a perspective view illustrating the means provided for spreading the cloth in preparation for cutting.

The subsequent arrangement of the tentered cloth web in preparation for cutting is carried out on a spread machine which is operated to lay out a predetermined length of the web from the tentered roll on a spread table in the manner illustrated in FIG. 2, in which the spread machine is indicated generally by the reference numeral 10 and the spread table by the reference numeral 12. The spread table 12 comprises any suitable frame structure arrangement, as at 14, on which an endless conveyor belt 16 may be supported to present an elongated surface at its top reach that approximates the tentered web W in width and extends in length for an extended predetermined length of the web W laid out thereon for cutting of the desired pattern blanks therefrom. A convenient length for the elongated surface presented by the conveyor belt 16 on the spread table 12 is about 28 yards, although it may alternatively be provided in a longer or shorter length as best suited for the particular form or type of pattern blanks to be cut.

On the spread table conveyor belt 16, a longitudinal reference line 18 is marked near one edge to indicate the position at which one edge of the tentered web W should be aligned for proper subsequent delivery to the cutting operation, and the spread table frame structure 14 is fitted with guide rails 20 at each side of the conveyor belt 16 and in parallel relation to the longitudinal reference 18 marked thereon for carrying the spread machine 10, as explained further below. In addition, a trough 22 is arranged on the spread table frame structure 14 outwardly adjacent the guide rail 20 that is at the side of conveyor belt 16 remote from the longitudinal reference 18 marked thereon, for a purpose that will be noted presently.

The spread machine 10, the details of which are further illustrated in FIGS. 3 and 4, is mounted at wheels 24 on the spread table guide rails 20 for guided travel thereon lengthwise of the conveyor belt 16, the wheels 24 being provided on a carriage structure 26 on which the operating elements of the spread machine 10 are arranged. The spread machine operating elements comprise stand members 28 for supporting a tentered cloth supply roll R to have the tentered web W withdrawn therefrom; an initial elevated guide roll 30 arranged to have the web W trained thereover for withdrawal from the roll R; a cloth support panel 32 disposed to direct the web W downwardly from the guide roll 30 while preventing any sagging thereof; pairs of roll members 34 and 36 disposed adjacent the lower edge of the support panel 32 to have opposite edge portions of the web W trained respectively therebetween for alignment control during withdrawal from the supply roll R; a pair of guide rolls 38 between which the web W may be trained below the pairs of roll members 34 and 36 to present one edge thereof continuously at an alignment feeler 40; and a further pair of guide rolls 41 between which the web W is trained for delivery onto the spread table 12 from the spread machine 10.

The pairs of roll members 34 and 36 that are provided on the spread machine 10 for web alignment control, as mentioned above, are arranged with the longitudinal axes of the roll members 34 and 36 in each pair parallel and extending angularly inward of the respective web edge portions in the direction of web withdrawal. All of the roll members 34 and 36 of both pairs are mounted for free rotation, with one roll member 34 of each pair carried on a fixed axis in a stationary yoke 42 and the other roll member 36 on a movable axis in a shiftable yoke 44, so that each roll member pair may be operated for selectively gripping and releasing the respective web edge portions trained therebetween. Operation of the pairs of roll members 34 and 36 for this purpose is actuated through solenoids 46 arranged for shifting the yoke members 44 so as to move the roll members 36 alternatively to form a nip with the fixed roll members 34 or to a retracted position spaced therefrom, and this actuation by the solenoids 46 is controlled from the alignment feeler 40 through electrical circuit means as illustrated in FIG. 5.

Figure 5:
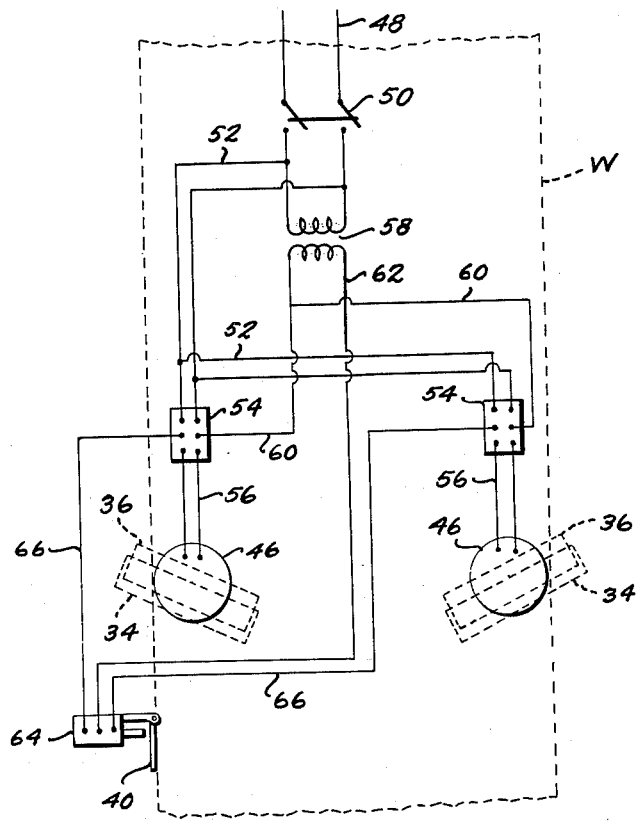
FIG. 5 is a schematic wiring diagram of the web guiding arrangement incorporated in the spreading means illustrated in FIGS. 2, 3 and 4.

The FIG. 5 illustration diagrams the electrical circuit means in relation to a dotted line indication of the web W and the pairs of roll members 34 and 36, the alignment feeler 40 being represented at one edge of the web W and the solenoids 46 at the respective movable roll members 36. The circuit means connecting these members comprises a line circuit 48, which is also seen in FIG. 2 in the form of a cable running to the spread machine 10 from the trough 22 provided on the spread table 12 in which the line circuit cable 48 lies for extension in either direction from a connection about midway the length of the spread table 12 as the spread machine 10 is moved lengthwise thereof. The line circuit 48 runs to a switch 50 at the spread machine 10, beyond which branching circuits 52 are arranged to connect solenoid relays 54 in parallel for energizing the solenoids 46 through connections 56 therefrom. The line circuit 48 also runs beyond the line switch 50 to a transformer at 58 from which a low voltage circuit has one side connected in parallel through branching legs 60 to the solenoid relays 54, and has the other side 62 thereof connected to a microswitch 64 at the alignment feeler 40, with the microswitch 64 in turn connected through parallel legs 66 to the relays 54 to complete a selective control circuit therefor.

By this arrangement, the alignment feeler 40 is arranged to transmit its sensing of the adjacent edge of the web W for operating the pairs of roll members 34 and 36 so as to control the alignment of this adjacent edge closely against lateral shifting. In sensing the position of the web edge, the alignment feeler 40 acts to maintain the low voltage control circuit always connected at the microswitch 64 through one or the other of the parallel legs 66. As a result, one or the other of the relays 54 is always actuated to energize the related solenoid 46 and cause the movable roll member 36 thereat to close off the paired stationary roll member 34 and grip the web edge portion trained therebetween. Because of the angular disposition of the pairs of roll members 34 and 36, this gripping of the web edge portion causes the web W to be pulled laterally toward that edge as it is withdrawn through the nip of the closed roll members 34 and 36. Such lateral shifting of the web W, however, is immediately sensed by the alignment feeler 40 so as to reverse the control connections through the microswitch 64 and cause the opposite pair of roll members 34 and 36 to close on the opposite edge portion of the web W and thereby reverse the lateral pull. In this way, the pairs of roll members 34 and 36 are operated for continuous alternative gripping of the respective web edge portions in relation to the lateral position of the web edge at the alignment feeler 40 so as to maintain the lateral alignment of this edge within a variation either way of 1/32 of an inch. Accordingly, by setting the alignment feeler 40 on the spread machine 10 in the relation to the longitudinal reference line 18 provided on the spread table conveyor 16, by means of a suitable lateral adjustment screw or the like as indicated at 40' in FIGS. 3 and 4, the web W can be delivered from the spread machine 10 with the adjacent edge maintained in close alignment with the longitudinal reference 18.

Delivery of the web W from the spread machine 10 is effected by moving it to a starting position at one end of the spread table 12 and then manually drawing out the leading end of the web W and placing it at the starting position with the adjacent edge thereof aligned at the longitudinal reference line 18. This aligned leading end portion of the web W is then held in place manually while the spread machine 10 is started toward the other end of the spread table 12, the spread machine carriage structure 26 being fitted with handles 68 at which it may be pushed conveniently by the operator carrying out the spreading operation. After a few yards of the web W have been laid on the spread table 12 in this manner, the weight of the cloth will be sufficient to hold it in place and the operator then only needs to keep the spread machine 10 moving back and forth on the spread table 12 while inserting a fold rod in the cloth as each end of the table is reached so as to hold the previously spread cloth in place as the direction of spreading is reversed. The fold rods (not shown) may consist simply of flat steel bars or the like of sufficient weight to hold the cloth folds in place, one such fold rod being inserted as each fold is made and the inserted rods being removed at the end of the spreading operation to leave a cloth spread S on the spread table 12 (see FIG. 2) formed of a plurality of cloth layers laid out from the web W and doubled back upon themselves successively in a stack of predetermined length and suitable height and with one side edge thereof closely aligned at the longitudinal reference line 18.

As previously mentioned, the predetermined length is selected beforehand in proper multiple to the pattern blanks to be cut, while the height to which the spread S is built will depend upon the capacity of the blank cutting means employed. Ordinarily, the height of the spread S will be of the order of four inches and will comprise 18 to 24 or more pairs of cloth layers (i.e., layers resulting from the spreading of web W lengthwise on the spread table 12 and then back again upon itself). When the web W is specially formed at one face, as in the case of Canton flannel, the arrangement of the layers of the spread S in pairs necessarily results in the cutting of paired blanks therefrom, such as right and left hand blanks for glove manufacture.

When the spread S has been built to the proper size on the spread table 12, the web W is severed at the spread machine 10 and the spread S is then ready to be advanced stepwise for the blank cutting operation. For this purpose, the spread table 12 is equipped with means for indexed movement of the spread table conveyor belt 16, as illustrated in FIGS. 6 and 7 in which the conveyor belt 16 is seen trained over a drum 70 carried on a driven shaft 72 that is in turn journalled on the spread table frame structure 14 adjacent the discharge end thereof. The conveyor belt 16 is suitably a canvas conveyor fitted with spaced bars or slats 74 that extend to each side for fastening to sprocket chains as at 76, which run over sprocket wheels 78 carried on the driven shaft 72 beside the conveyor drum 70 for providing a positive drive connection to the conveyor belt 16.

The indexing drive mechanism for transmitting the stepwise advancing movement through the driven shaft 72 to the conveyor belt 16 comprises a clutch means as indicated at 80 on the shaft 72 engageable therewith for turning the sprocket wheel 78 (and conveyor drum 70) thereon only in the direction indicated by the directional arrow in FIG. 7. The clutch means 80 in turn carries a rock arm 82 having a connecting rod structure 84 running to its extending end from a crank arm 86 mounted on one output shaft 88 of a two-shaft speed reducer 90, the other output shaft 92 of which carries a timing disc 94, and the drive input to which is received from a brake motor 96. A switch means at 98 is provided for controlling the operation of the brake motor 96 and includes a switch element at 100 disposed in relation to the timing disc 94 for actuation by a lug 94' thereon to stop the brake motor 96 upon completion of each operating cycle of the crank arm 86.

The crank arm 86 is arranged to make the effect of its operating cycle adjustable through a traverse screw 102 carried lengthwise therein for manipulation from a turning handle 102' at its outer end to set the position of a pivot stud follower 104 thereon at which the adjacent end of the connecting rod structure 84 is attached, and thereby set the throw of the crank arm 86 to determine the extent of each stepwise advancing movement transmitted to the conveyor belt 16. The pivot stud follower 104 is fitted with an indicating pointer 106 which may be used in relation to suitable calibrated scale graduations or the like (not shown) on the crank arm 86 for setting the crank throw in accordance with the particular size of the pattern blanks being cut.

A cycle of operation for the indexing drive mechanism is initiated manually at the switch means 98 by pressing a start button thereat and thereby start the brake motor 96 which is arranged to drive the crank arm 86 and timing disc 94 in a counterclockwise direction as indicated in FIG. 7. Rotation of the crank arm 86 in this direction from an upstanding position initially acts to draw the rock arm 82 to the left as seen in FIGS. 6 and 7, and during this period to leave the driven shaft 72 motionless. As soon as the crank arm 86 passes dead center, however, its reaction on the rock arm 82 is reversed so as to move it now to the right as seen in FIGS. 6 and 7, and thereupon to cause engagement of the driven shaft 72 through the clutch means 80 for transmitting a stepwise advancing movement to the conveyor belt 16 in the extent determined by the setting of the crank arm 86. Then, as the crank arm 86 passes through dead center again, the remaining portion of the inactive stroke of rock arm 82 is reached to complete the cycle as measured by the timing disc 94 through the lug 94' which actuates the switch element 100 to stop the brake motor 96 and bring the crank arm 86 to rest at the position from which it started.

Each cycle of operation as described above results in advancing a spread S on the conveyor belt 16 for a blank cutting operation and is repeated as many times as there are blank cutting multiples in the spread S. In advancing a new spread S into position for cutting the first blanks therefrom, it will usually be necessary to inch it into proper phase with the cutting means, and this may be readily done with the indexing drive mechanism of the present invention simply by reversing the brake motor through an inching reverse button included at the switch means 98, the result of which reversal is to move the rock arm 82 to the right so as to obtain directly the inching movement needed for initially setting the spread S in phase and with the first step thereof in place at the cutting means, which is arranged as illustrated in FIGS. 8 and 9.

As seen in FIGS. 8 and 9, the cutting means suitably comprises a conventional press structure 108 having a vertically reciprocating slide 110 for carrying die to close on a bed at 112 formed preferably by a heavy end grain wood table. For mounting the cutting die on the slide 110, a carriage structure 114 is arranged on rails 116 that are suitably fastened and braced at one side of the slide 110 for shifting of the cutting die carriage 114 laterally thereon between an active position at which the cutting die is aligned beneath the slide 110 as indicated at D in FIG. 9, and a retracted position at which the cutting die is withdrawn to the side of slide 110 as at D' in FIG. 9; the positioning of the cutting die carriage 114 in this respect being controlled through an air cylinder 118 provided with suitable operating means (not shown) so that the press operator may position the cutting die beneath the slide 110 at D for a cutting operation and then retract it to the D' position so that it is out of the way for removal of the cut pattern blanks readily and with complete safety.

It should also be noted that the cutting die is arranged simply to hang freely on the carriage 114, with confining angle members 120 and removable clamping clips 122 provided for maintaining it at a fixed lateral relation thereon. As a result, if the cutting press 108 is operated with the cutting die at the retracted D' position, the die simply rises off of the carriage 114 and then settles back in place with no harm done. In addition, this arrangement of the cutting die on the carriage 114 makes it extremely easy to change cutting dies, as it is only necessary to remove the clamping clips 122 in order to allow an installed cutting die to be slid off the carriage 114 and a new one set in place thereof.

The cloth handling system of the present invention as arranged in the above described manner provides for handling a cloth supply to excellent advantage in cutting pattern blanks therefrom in preparation for sewing or the like as indicated in FIG. 1. Also, the system is remarkably adjustable for variations in the pattern blanks desired, both as to adjusting the cloth handling for such variations as well as providing an extremely simple and efficient manner of changing over the cutting operation in accordance with the variations desired.

The present invention has been described in detail above for purposes of illustration only and is not intended to be limited by this description or otherwise except as defined in the appended claims.

We claim:

1. Apparatus of the character described comprising movable means presenting an elongated surface in the direction of movement, means for spreading a cloth web lengthwise on said surface with widthwise tensioning means to align one web edge only in relation to a predetermined longitudinal reference so that any variations in the width of the web will be located along the opposite edge thereof, and settable means for stepwise movement of said first mentioned means in a predetermined stepwise extent.

2. Apparatus of the character described comprising an endless conveyor belt presenting an elongated surface on which a cloth web may be spread lengthwise, a drive shaft for moving said conveyor belt, clutch means on said drive shaft engageable for turning said shaft in one direction, a rock arm for turning said shaft through said clutch means, a crank mechanism for oscillating said rock arm through a cycle, means for driving said crank mechanism, cycle timing means for automatically stopping said driving means with said rock arm at a position intermediate the inactive stroke thereof upon completion of a cycle, and means for manually starting said driving means in a normal driving direction and selectively in the reverse direction.

3. Apparatus for cutting cloth pattern blanks comprising a press mechanism including a stationary bed for supporting cloth to have blanks cut therefrom and a movable slide for carrying a cutting die to close on said bed, support means mounted on said slide, a cutting die carriage mounted on said support means for shifting laterally between an active position aligned with said slide and an inactive position to one side of and spaced from said active position, and means for shifting said carriage between said positions.

4. Apparatus as defined in claim 3 and further characterized in that said carriage is arranged to move said carriage to an inactive position spaced from said slide and to support a cutting die in freely hanging relation while maintaining a fixed lateral relation therewith.

5. Apparatus of the character described comprising movable means presenting an elongated surface in the direction of movement, means for spreading a cloth web lengthwise on said surface with the alignment of one web edge controlled in relation to a predetermined longitudinal reference, and settable means for stepwise movement of said first mentioned means in a predetermined stepwise extent, said settable means comprising a drive shaft for moving said first mentioned means, means for indexing said drive shaft including a crank mechanism having an adjustable throw, means for driving said crank mechanism, and cycle-timing means operated by said driving means in relation to said crank mechanism for stopping said driving means upon completion of a cycle of said crank mechanism.

6. A method of handling a cloth web for cutting cloth pattern blanks therefrom which comprises spreading a predetermined length of a cloth web on a movable surface and doubling an equal length of said web back upon itself a plurality of times, applying widthwise tensioning to said cloth web as it is spread on said movable surface and while tensioning widthwise maintaining only one edge of said web aligned at a predetermined longitudinal reference so that any variations in the width of the web will be located along the opposite edge thereof, and then causing stepwise movement of said movable surface parallel to said longitudinal reference and in a predetermined stepwise extent, whereby said web may be spread so as to minimize widthwise waste and advanced so as to minimize lengthwise waste in cutting said pattern blanks therefrom.

References Cited in the file of this patent

UNITED STATES PATENTS

| | | |
|---|---|---|
| 308,081 | Lodge et al. | Nov. 18, 1884 |
| 1,519,742 | Tamberlin | Dec. 16, 1924 |
| 1,596,954 | Tuttle | Aug. 24, 1926 |
| 1,625,026 | Holmes | Apr. 19, 1927 |
| 1,629,268 | Greenberg | May 17, 1927 |
| 1,733,463 | McKinley | Oct. 29, 1929 |
| 1,962,432 | Daley | June 12, 1934 |
| 1,978,051 | MacDonald | Oct. 23, 1934 |
| 2,217,096 | Breth | Oct. 8, 1940 |
| 2,352,339 | Olney | June 27, 1944 |
| 2,635,873 | Worm | Apr. 21, 1953 |
| 2,737,385 | Hansen | Mar. 6, 1956 |
| 2,752,657 | Meneo | July 3, 1956 |
| 2,801,102 | Walter et al. | July 30, 1957 |

FOREIGN PATENTS

| | | |
|---|---|---|
| 801,032 | Germany | Dec. 21, 1950 |